(12) United States Patent
Paulson et al.

(10) Patent No.: US 8,042,735 B2
(45) Date of Patent: Oct. 25, 2011

(54) DESKTOP CARD PROCESSOR

(75) Inventors: Arthur Joseph Paulson, Minneapolis, MN (US); Mark James Sobania, Ham Lake, MN (US); David Evert Wickstrom, Bloomington, MN (US); David Alan Pierson, Maple Grove, MN (US)

(73) Assignee: DataCard Corporation, Minnetonka, MN (US)

( * ) Notice: Subject to any disclaimer, the term of this patent is extended or adjusted under 35 U.S.C. 154(b) by 588 days.

(21) Appl. No.: 11/935,603

(22) Filed: Nov. 6, 2007

(65) Prior Publication Data

US 2008/0106585 A1 May 8, 2008

Related U.S. Application Data

(62) Division of application No. 11/051,348, filed on Feb. 4, 2005, now Pat. No. 7,434,728.

(51) Int. Cl.
*G06K 5/00* (2006.01)
(52) U.S. Cl. ........................... 235/380; 400/521
(58) Field of Classification Search .................. 235/487, 235/380; 400/521
See application file for complete search history.

(56) References Cited

U.S. PATENT DOCUMENTS

| 5,426,283 A | 6/1995 | Berthozat et al. |
| 5,762,431 A | 6/1998 | Pawelka et al. |
| 5,768,143 A | 6/1998 | Fujimoto |
| 5,771,058 A | 6/1998 | Kobayashi |
| 5,806,999 A | 9/1998 | Kobayashi |
| 5,886,726 A | 3/1999 | Pawelka et al. |
| 5,959,278 A | 9/1999 | Kobayashi et al. |
| 6,279,901 B1 | 8/2001 | Fulmer |
| 6,315,283 B1 | 11/2001 | Haas et al. |
| 6,431,537 B1 | 8/2002 | Meier |
| 6,536,758 B2 | 3/2003 | Meier et al. |
| 6,588,673 B1 * | 7/2003 | Chan et al. ............... 235/492 |
| 6,668,716 B2 | 12/2003 | Tsuruta et al. |
| 6,722,649 B2 | 4/2004 | Yui |
| 2003/0173406 A1 * | 9/2003 | Bi et al. .................. 235/491 |
| 2003/0183695 A1 * | 10/2003 | Labrec et al. ............ 235/487 |
| 2005/0006460 A1 * | 1/2005 | Kreuter .................... 235/380 |
| 2005/0082738 A1 * | 4/2005 | Bryant et al. ............ 271/10.01 |
| 2005/0104281 A1 * | 5/2005 | Stender et al. ........... 271/185 |

FOREIGN PATENT DOCUMENTS

DE 20 2005 012 928 U1 12/2005
ES 1 064 177 U 2/2007

OTHER PUBLICATIONS

Web page archive "New concept for an outstanding card personalization laser system" obtained from http://web.archive.org/web/20040127063254/http://www.ixla.ch/ Allegedly posted on www.ixla.ch/ Jan. 27, 2004.

(Continued)

*Primary Examiner* — Daniel Hess
(74) *Attorney, Agent, or Firm* — Hamre, Schumann, Mueller & Larson, P.C.

(57) ABSTRACT

A desktop card processor having increased card processing capabilities without increasing the horizontal footprint of the card processor. The card processor utilizes multiple card processing levels stacked in vertically separated levels to minimize the horizontal footprint of the card processor.

13 Claims, 16 Drawing Sheets

OTHER PUBLICATIONS

Co-pending U.S. Appl. No. 11/051,125, entitled "Sheet Material With Index Openings and Method for Making and Using", filed Feb. 4, 2005.

U.S. Appl. No. 10/716,579, filed Nov. 17, 2003.

Lasercard—Optical Card Read/Write Drive Model: 600-Q-2004 LaserCard Corporation.

PCT Written Opinion of the International Searching Authority for corresponding International Application No. PCT/US06/01183.

PCT International Search Report for corresponding International Application No. PCT/US06/01183.

\* cited by examiner

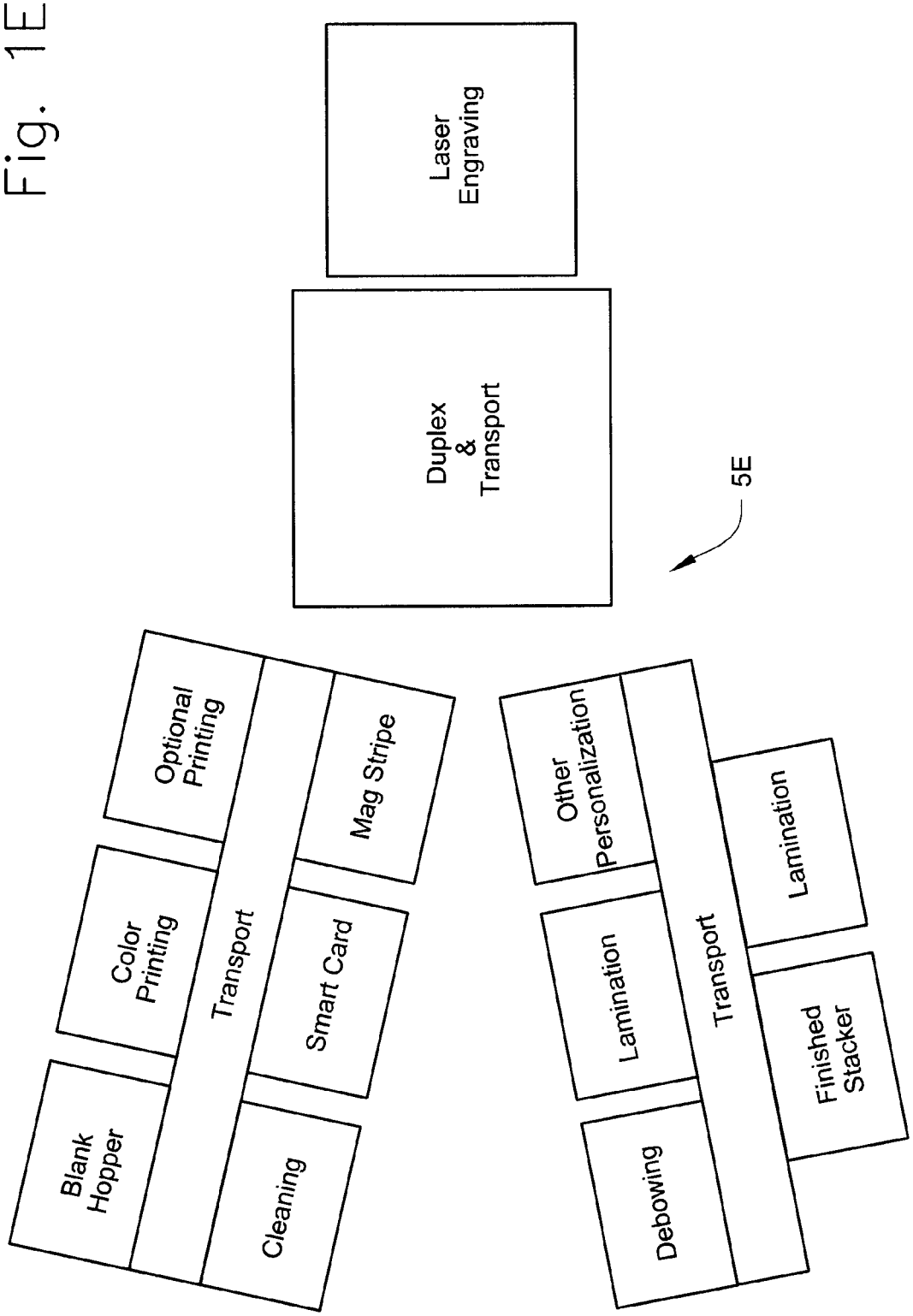

DESKTOP CARD PROCESSOR

CROSS-REFERENCE TO RELATED APPLICATIONS

This application is a Division of application Ser. No. 11/051,348, filed Feb. 4, 2005, which application is incorporated herein by reference.

FIELD OF THE INVENTION

The invention relates to plastic card processing equipment, particularly desktop processing equipment, that perform at least one processing operation on a plastic card, such as a credit card, driver's license, identification card and the like. More particularly, the invention relates to desktop card processing equipment having at least two vertically separate card processing levels.

BACKGROUND OF THE INVENTION

Plastic cards are used in a number of applications, such as identification cards, security badges, employee badges, driver's licenses, credit cards, membership cards, and the like. The use of card processing equipment for processing these types of plastic cards is well known. In such equipment, a plastic card to be processed is input into the processing equipment, at least one processing operation is performed on the input card, and the card is then output from the processing equipment. The processing operation(s) performed on the plastic card by known processing equipment includes one or more of printing, laminating, magnetic stripe encoding, programming of a chip embedded in the card, card cleaning, and the like.

The processing equipment is often configured in the form of a desktop unit. An example of a popular desktop plastic card processing unit is a desktop plastic card printer which performs monochromatic or multi-color printing on a card that is input into the printer. Examples of desktop units that perform printing are disclosed in U.S. Pat. Nos. 5,426,283; 5,762,431; 5,886,726; 6,315,283; 6,431,537; and 6,536,758. Of these, U.S. Pat. No. 5,426,283 describes a unit that performs chip programming in addition to printing.

Desktop card processing equipment is designed to be relatively small, so that the equipment can fit onto a desk or table. The desktop card processor may be positioned on a support surface with other office machines and workspace, so that table and desk space is at a premium. Therefore, the amount of desk or table space required for the desktop card processor (i.e., its "footprint") should be minimized.

At the same time, it is desirable that a piece of desktop card processing equipment be able to perform multiple card processing operations, thereby increasing the performance capability of the equipment.

Additionally, desktop card processors should be easy to operate and maintain with only a minimal amount of specialized training. Desktop card processors are often operated by personnel for whom producing cards is only an incidental portion of their job, such as a security guard or a desk clerk, and not by personnel who have special training in such equipment. The operation and maintenance of the card processor should thus be relatively intuitive and straightforward. Furthermore, the cards that are output from the card processor must be of the highest quality, attractive, and durable.

While existing desktop card processing equipment has proven adequate, there is a continuing need for further improvements. In particular, there is a need for desktop card processing equipment that can perform multiple card processing operations on a card while maintaining a relatively compact footprint for the processing equipment.

SUMMARY OF THE INVENTION

The invention relates to plastic card processing equipment for processing data bearing plastic cards, such as credit cards, driver's licenses, identification cards, loyalty cards and the like. More particularly, the invention relates to a desktop card processor that is capable of performing multiple processing operations on a card while maintaining a compact footprint. The card processor is configured so that cards to be processed and processed cards are positioned on one side of the card processor. This allows the card processor to be positioned on a desk against a wall or in a corner for more efficient utilization of space.

The card processor maintains a compact footprint on account of having multiple card processing levels stacked in vertically separated levels. The cards are loaded into the card processor and processed on an upper card processing level, then are flipped and lowered to a lower card processing level for additional processing.

The upper card processing level can comprise a printing mechanism and one or more other card processing mechanisms, and the lower card processing level can comprise one or more laminating mechanisms and one or more other card processing mechanisms. This arrangement allows the card processor to incorporate dual laminating mechanisms to laminate both sides of a card in a single pass without significantly increasing the footprint of the card processor.

Further, the card processor is configured to allow the lamination foil, which is consumed by the card processor during operation and must be replaced when the supply is depleted, or other consumable foil used by the card processing equipment, to be replaced without opening the machine cover. The lamination foil cartridge(s) is directly accessible from the outside of the card processor. This allows the lamination foil to be replaced by an operator without having to open any portion of the processor housing.

The card processor also includes a space-saving output hopper that holds a relatively large number of processed cards without increasing the overall height of the card processor. The space-saving output hopper is configured so that it may be positioned over the edge of a table or desk or act as a support for the front end of the card processor.

BRIEF DESCRIPTION OF THE DRAWINGS

FIGS. 1A-1E are schematic illustrations of variations of a card processor according to the invention.

DETAILED DESCRIPTION OF THE PREFERRED EMBODIMENT

Figure 1A:
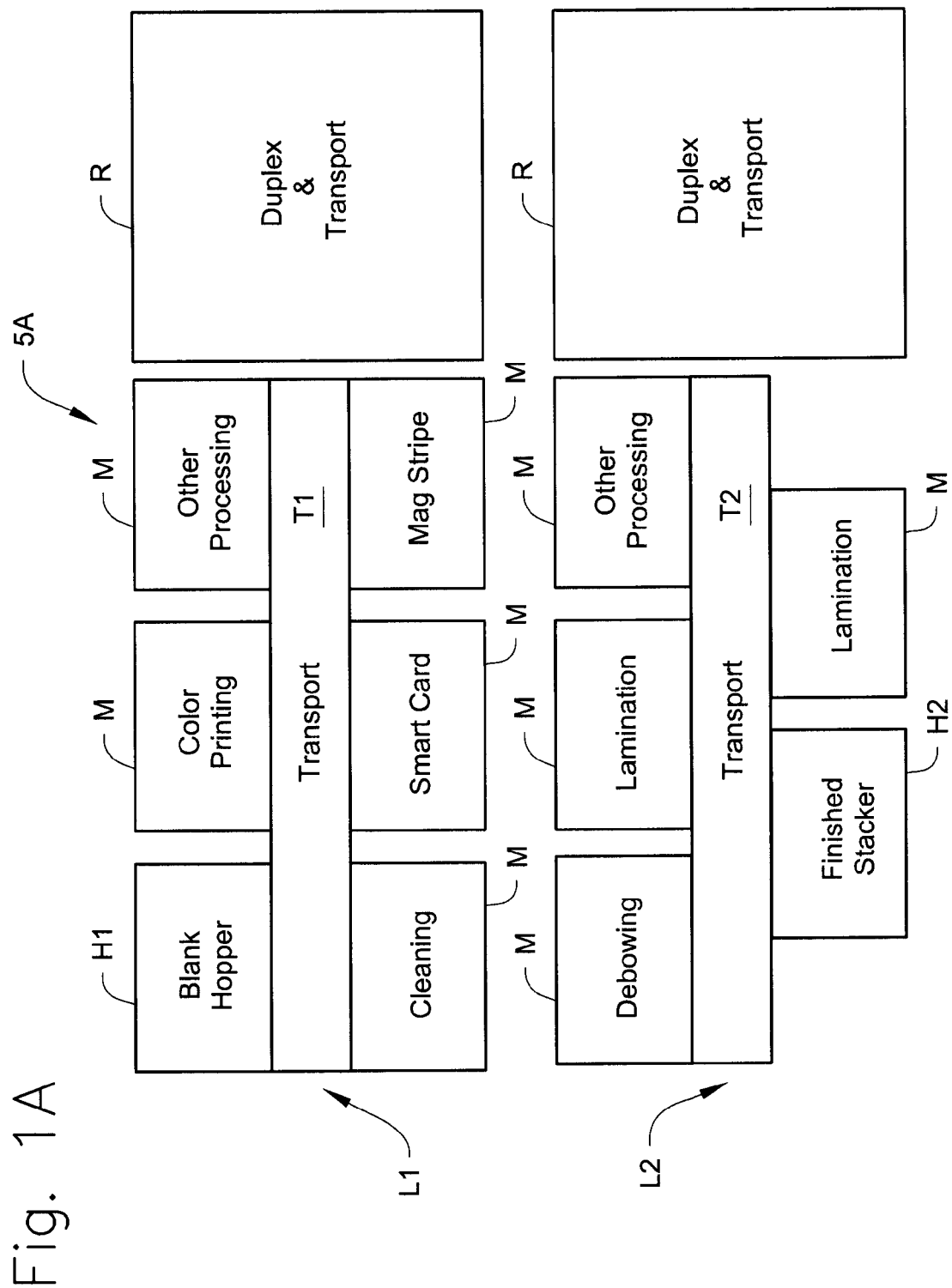

Improvements to plastic card processing equipment, particularly desktop card processing equipment, for processing data bearing plastic cards, such as credit cards, driver's licenses, identification cards, loyalty cards and the like, are described herein. Desktop card processing equipment described herein have enhanced space utilization, while having enhanced card processing capabilities.

A desktop card processor according to the invention will be described as performing operations on a plastic card. For example, the plastic card can be ID1-sized plastic card, but the concepts described herein could be used with cards of other sizes or made of material compositions other than plastic. A card generally has two substantially flat faces that may be referred to as the front side and back side of the card.

In addition, the desktop card processor according to the invention is configured to perform multiple processing operations on a card. Processing operations that can be performed on the card includes multiple ones of at least the following exemplary processing operations: multi-color printing, monochromatic printing, laminating, card cleaning, magnetic stripe encoding, laser printing, embedded computer chip programming, card de-bowing, indenting and embossing. Other card processing operations would be encompassed by the concepts of the invention was well.

The desktop card processor described herein has multiple card processing levels stacked in generally vertically separated levels, and input and output hoppers on the same end of the processor. The card processor will be described with respect to a card traveling initially along an upper card processing level and thereafter being transported downward to a lower card processing level which transports the card along the lower processing level to the output hopper. However, as an alternative, the card could initially travel along the lower card processing level after being fed from a lower input hopper, then be transported upward to the upper card processing level which transports the card along the upper level to an output hopper located above the input hopper.

FIGS. 1A-1E are schematic illustrations of exemplary variations of card processors that incorporate concepts of the invention. Common to each of the illustrated variations is a card input hopper H1 that is capable of holding a plurality of cards to be processed and a card output hopper H2 that is capable of holding a plurality of processed cards where the hoppers H1, H2 are located at what will be referred to as the front end region of the card processor, an upper card processing level L1, a lower card processing level L2, a plurality of card processing mechanisms M on each level and each of which is configured to perform a processing operation on a card, a card transport T1 for the upper card processing level and a card transport T2 for the lower card processing level for transporting cards along the processing levels L1, L2, and at least one reorienting mechanism R for transporting cards between the card processing levels L1, L2.

In the card processor 5A shown in FIG. 1A, the card processing mechanisms M of the upper level L1 include a cleaning mechanism for cleaning the front and/or back of the card, a color printing mechanism, a smart card mechanism for programming an integrated circuit chip on a card, a magnetic stripe encoding mechanism, and an optional other processing mechanism. The card processing mechanisms M of the lower level L2 include two lamination mechanisms for laminating the front and back of the card, a debowing mechanism for removing any bowing in the card that may have occurred, and any other processing mechanism that my be desired. The transport T1 takes a card from the input hopper H1 and transports the card to and through the card processing mechanisms M of the upper level L1. The card is then fed into the reorienting mechanism R which reorients the card to permit it to be transported downward to a second reorienting mechanism R associated with the lower level L2. The second mechanism R reorients the card suitable for card processing at the level L2, and the transport T2 transports the card to and through the card processing mechanisms M and ultimately to the output hopper H2.

Figure 1B:
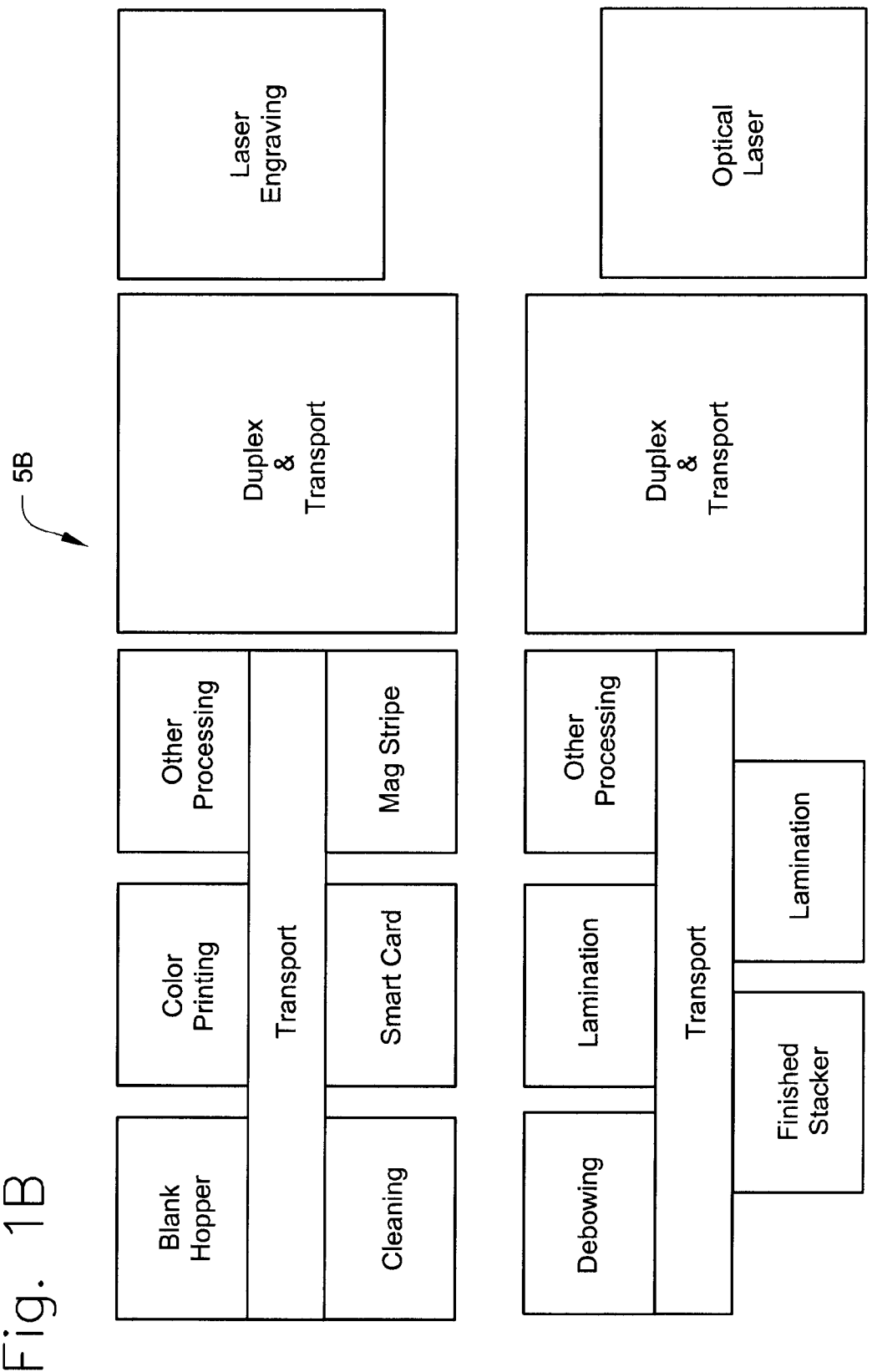

The card processor 5B shown in FIG. 1B is similar to the card processor 5A shown in FIG. 1A, but also includes an additional card processing mechanism M in the form of a laser engraving mechanism associated with the level L1 and an optical laser mechanism associated with the level L2. The laser engraving and optical laser mechanisms are disposed generally at the rear of the card processor.

Figure 1C:
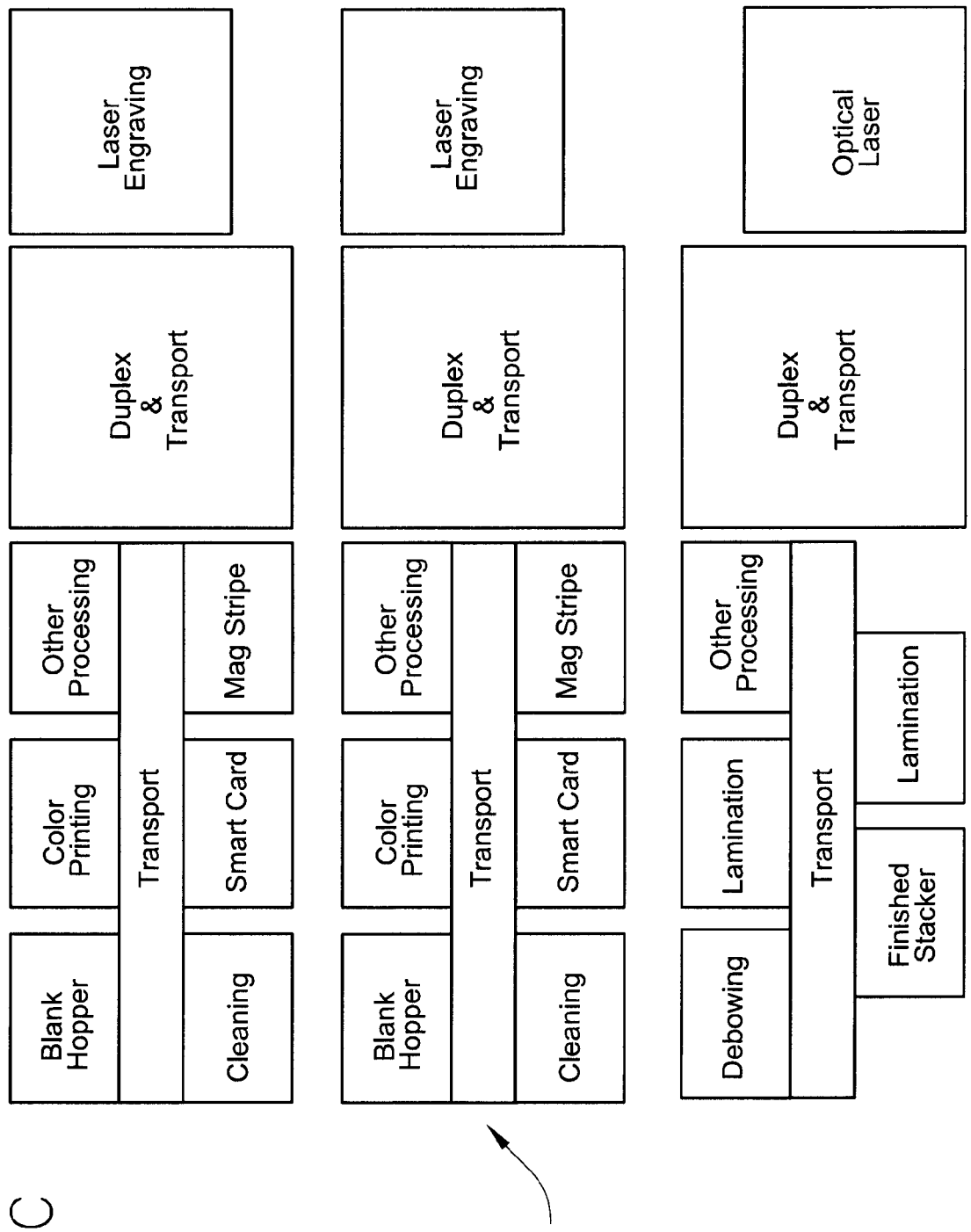

The card processor 5C shown in FIG. 1C is similar to the processor 5B shown in FIG. 1B, but includes a third card processing level L3 between the levels L1 and L2.

Figure 1D:
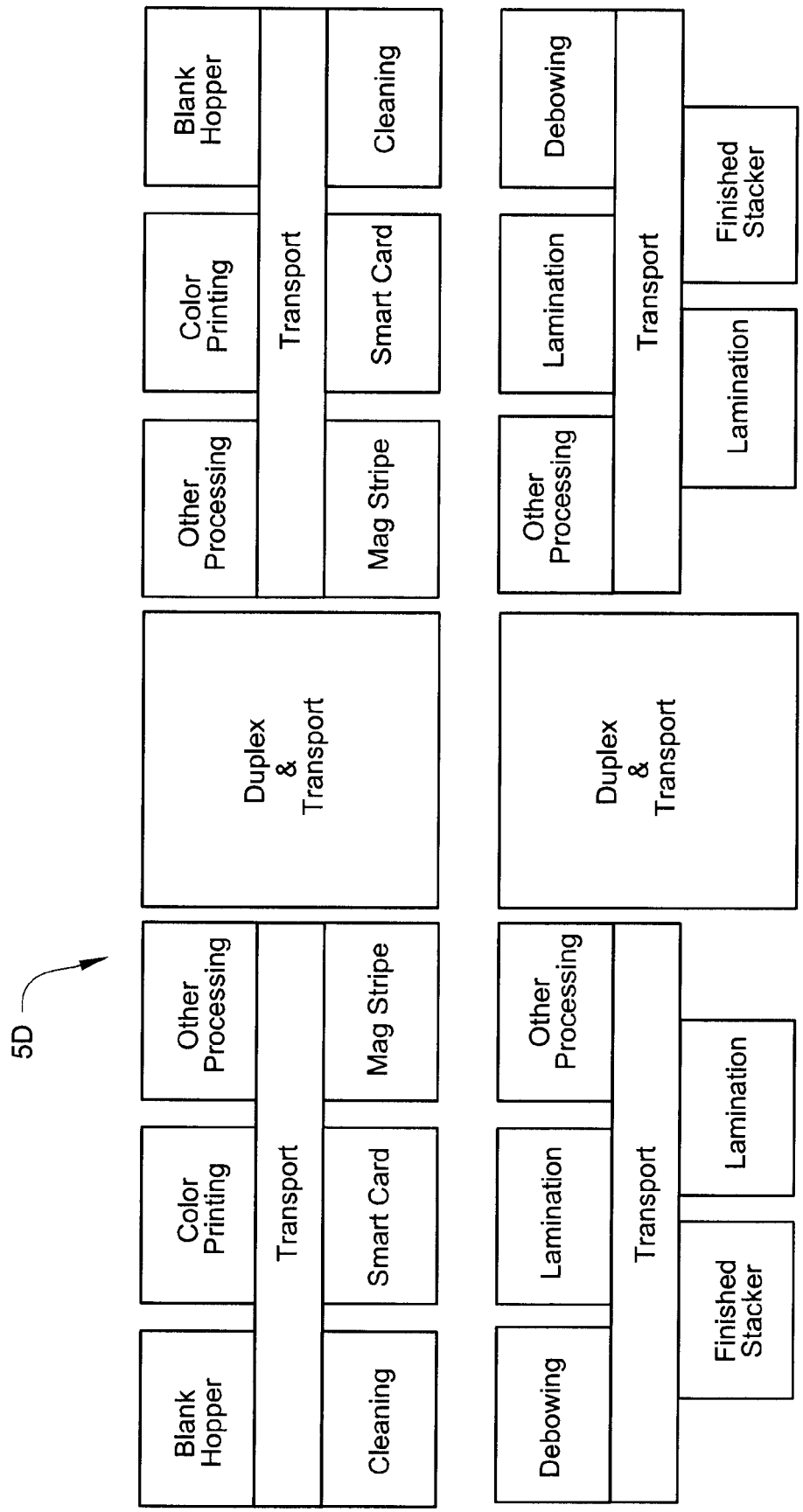

The card processor 5D shown in FIG. 1D is similar to the processor 5A shown in FIG. 1A, but includes card processing levels on each side of the card reorienting mechanisms R, as well as hoppers H1 and H2 at the rear of the card processor.

The card processor SE shown in FIG. 1E includes two card processing levels L1, L2 but uses a single reorienting mechanism R that services both levels L1, L2.

Figure 2:
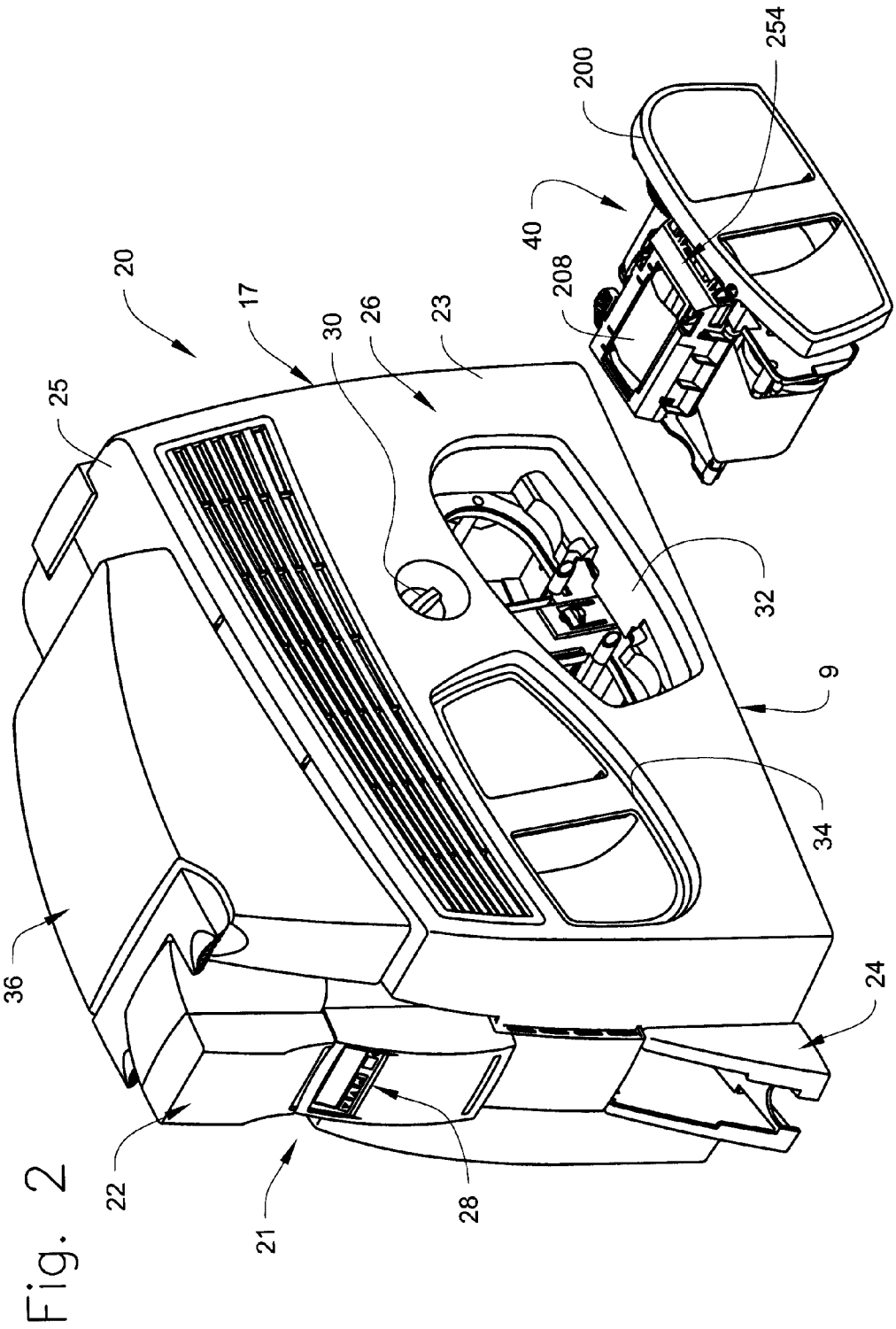
FIG. 2 is a perspective view of a card processor according to the invention.

Attention is now directed to FIG. 2 which illustrates a specific implementation of a card processor 20 in perspective view. Card processor 20 includes a housing 26 having an input/output end 21 with a card input hopper 22 adjacent to input/output end 21 for staging cards to be processed and a card output hopper 24 for receiving processed cards from the card processor. Card processor 20 also includes a user display and input 28 at the input/output end 21 where relevant information concerning the status and operation of the card processor can be communicated to the operator and the operator can enter commands, a manual card recovery knob 30 adjacent a side surface 23 that allows a card to be manually advanced through a lower processing level of the processor (a similar knob is located on the non-visible side of the processor for manually advancing a card through an upper processing level), and an access lid 36 adjacent a top surface 25 of the housing 26 for accessing the internal mechanisms of the card processor. The side surface 23 defines a pair of lamination foil cartridge cavities 32, 34 each of which receives a lamination foil cartridge 40, shown in FIGS. 2, 6 and 7. The lamination foil cartridges 40 will be discussed in greater detail below.

For convenience in describing the figures, the input/output end 21 of the card processor 20 will be described as being at a front end region of the processor, while the opposite end of the processor will be referred to as being a back end region 17 of the processor. Furthermore, the card processor has an upper end region and a lower end region 9.

Figure 3:
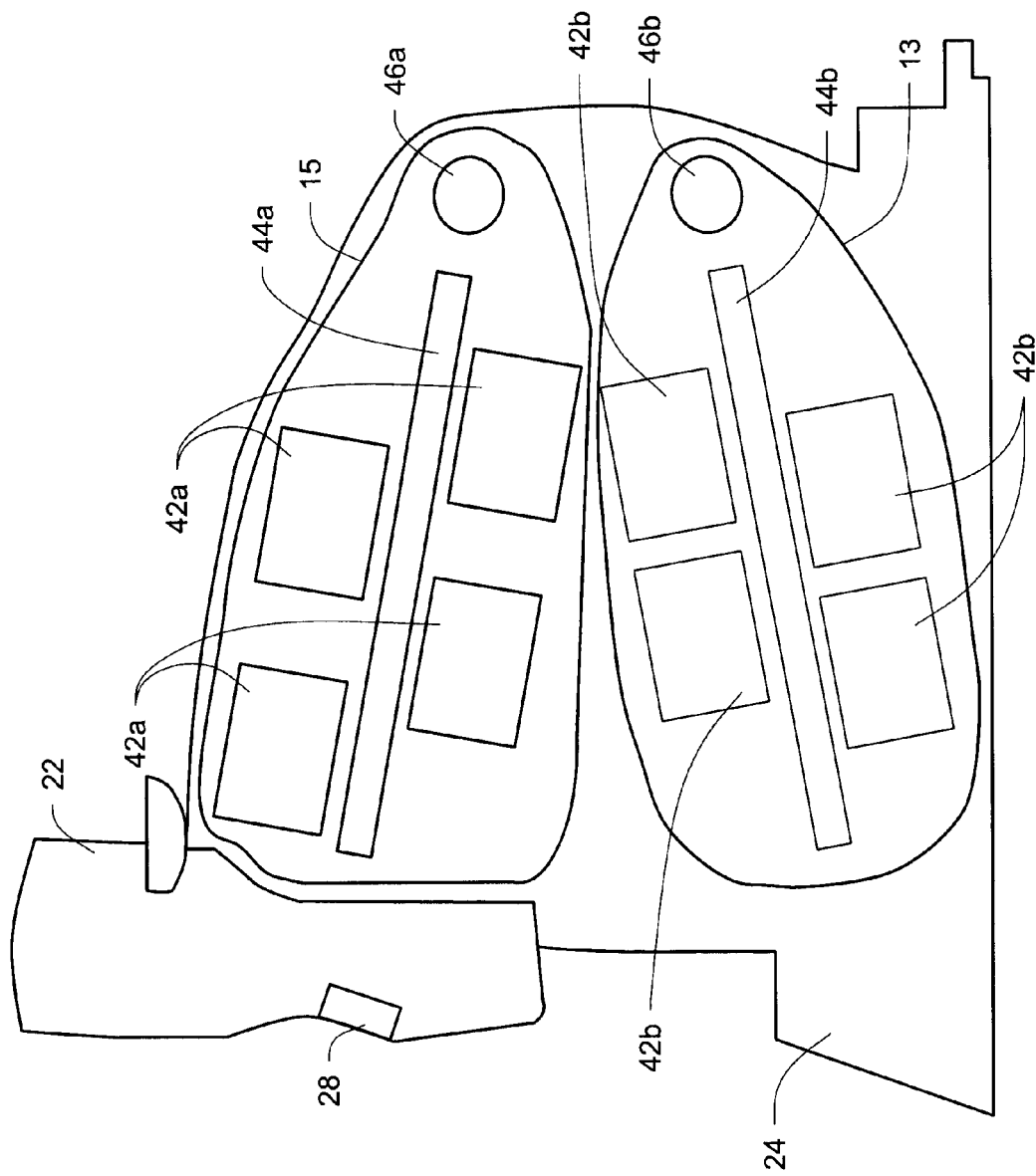
FIG. 3 is a schematic cross-sectional view of the card processor according to the invention.

FIG. 3 illustrates a schematic cross-sectional view of the card processor 20. The card processor 20 comprises a plurality of card processing mechanisms 42a, 42b; card transports 44a, 44b; and card reorienting mechanisms 46a, 46b. Card transport 44a can be called an upper card transport and card transport 44b can be called a lower card transport. Similarly, card reorienting mechanism 46a can be called an upper card reorienting mechanism, and card reorienting mechanism 46b can be called a lower card reorienting mechanism.

The group of components comprising the card processing mechanisms 42a, the upper card transport 44a, and the upper card reorienting mechanism 46a defines an upper or first card processing level 15. The group of components comprising the card processing mechanisms 42b, the lower card transport 44b, and the card reorienting mechanism 46b define a lower or second card processing level 13.

Card processing mechanisms 42a, 42b can perform any of a number of types of card processing operations. For example, the card processing mechanisms 42a, 42b may perform multi-color printing, monochromatic printing, laminating, card cleaning, magnetic stripe encoding, laser printing, embedded computer chip programming, card de-bowing, indenting, embossing, etc.

Card transports 44a, 44b are used to transfer cards from the input hopper 22 to the first card processing mechanism, from one card processing mechanism to the next card processing mechanism, and from the last processing mechanism to the output hopper. These card transports 44a, 44b are capable of imparting generally linear motion to a card and may comprise any of a number of types of mechanisms for imparting motion to cards. For example, card transports 44a, 44b may comprise a series of rollers driven by electric motors and a suitable drive train. Examples of a suitable transport mechanism for transporting cards in a desktop card processor are disclosed in U.S. Pat. Nos. 5,762,431 and 5,886,726, each of which is hereby incorporated herein by reference in its entirety.

When a card reaches the end of the card transport 44a, the card is transferred from the upper card processing level 15 to the lower card processing level 13 by means of card reorienting mechanisms 46a, 46b. The card reorienting mechanisms 46a, 46b—also known as duplexers—may be of the type disclosed in U.S. patent application Ser. No. 10/716,579 filed on Nov. 17, 2003, which is hereby incorporated herein by reference in its entirety.

Figure 4:
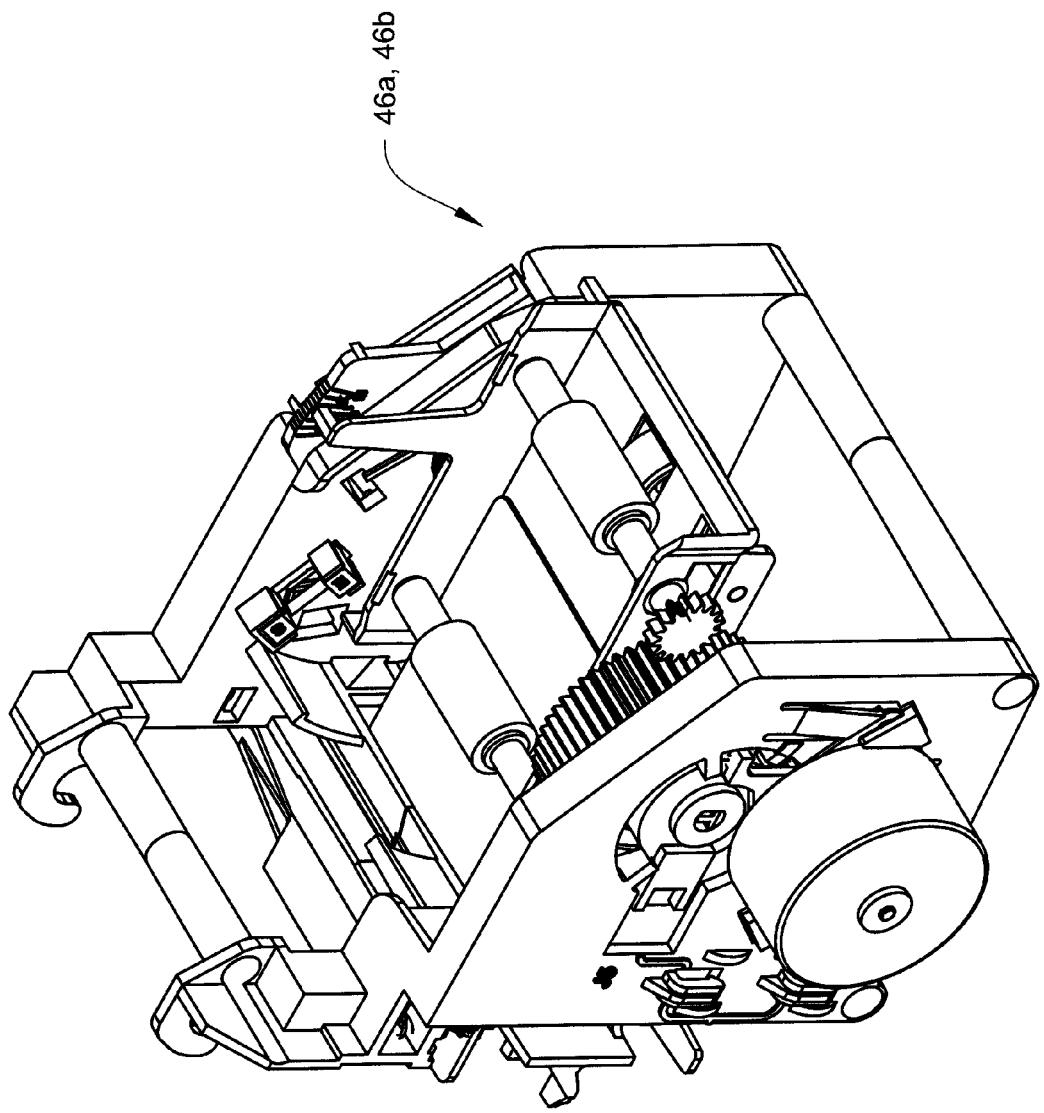
FIG. 4 is a schematic view of a card reorienting mechanism used in the card processor.

FIG. 4 illustrates one possible embodiment of a card reorienting mechanism 46a, 46b of the type disclosed in U.S. patent application Ser. No. 10/716,579. In operation, upper card transport 44a feeds a card into upper card reorienting mechanism 46a. In the disclosed configuration, cards are transported in a generally horizontal orientation. Upper card reorienting mechanism 46a rotates the card to an approximately vertical orientation so that the card points downward toward the lower card reorienting mechanism 46b. The card is then fed from the upper card reorienting mechanism 46a to lower card reorienting mechanism 46b, which then rotates the card back to its approximately horizontal orientation with either the front or back surface facing upward depending upon whether the front or back surface of the card is to be processed next. The card is then transferred to lower card transport 44b, which transports the card to the processing mechanisms in the lower card processing level 13. Other examples of duplex mechanisms for reorienting a card are disclosed in U.S. Pat. Nos. 5,806,999; 5,771,058; 5,768,143; and 6,279,901.

Some cards may require certain processing operations to be performed on both sides of the card. For example, a card may require information to be printed on both sides of the card and/or both sides of the card need to be laminated. This may be accomplished in several ways. The necessary card processing mechanisms could be located on both sides of the card transport 44a, 44b to allow processing operations to be performed on both sides of the card as the card makes a single pass along a card transport 44a, 44b. As an alternative, a card can also be processed on both sides of the card by transporting it through one card processing level in opposite orientations. For example, on the upper card processing level 15 this can be accomplished by feeding the card into upper card transport 44a, flipping the card 180 degrees in the upper card reorienting mechanism 46a, transferring the card back into upper card transport 44a, operating upper card transport 44a in the reverse direction so that the card moves toward the front end region of the processor, reversing the direction of the upper card transport 44a again so that the card moves through the processing mechanism(s) 42a toward the back end region of the processor, and processing the card as it passes through the appropriate card processing mechanisms 42a.

Figure 5A:
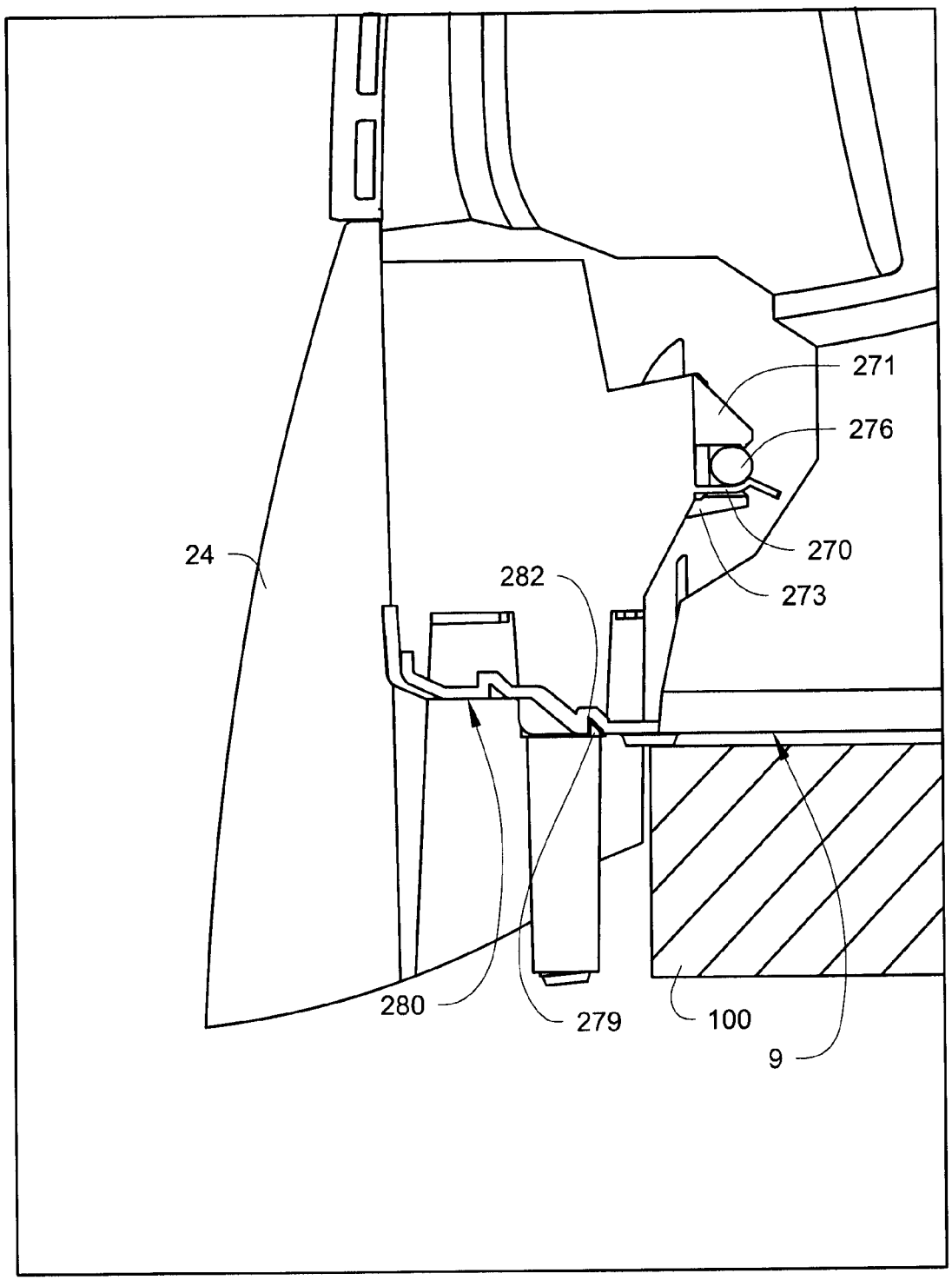
FIG. 5A is a cross-sectional detail view of an output hopper of the card processor where the output hopper overhangs a table.
Figure 5B:
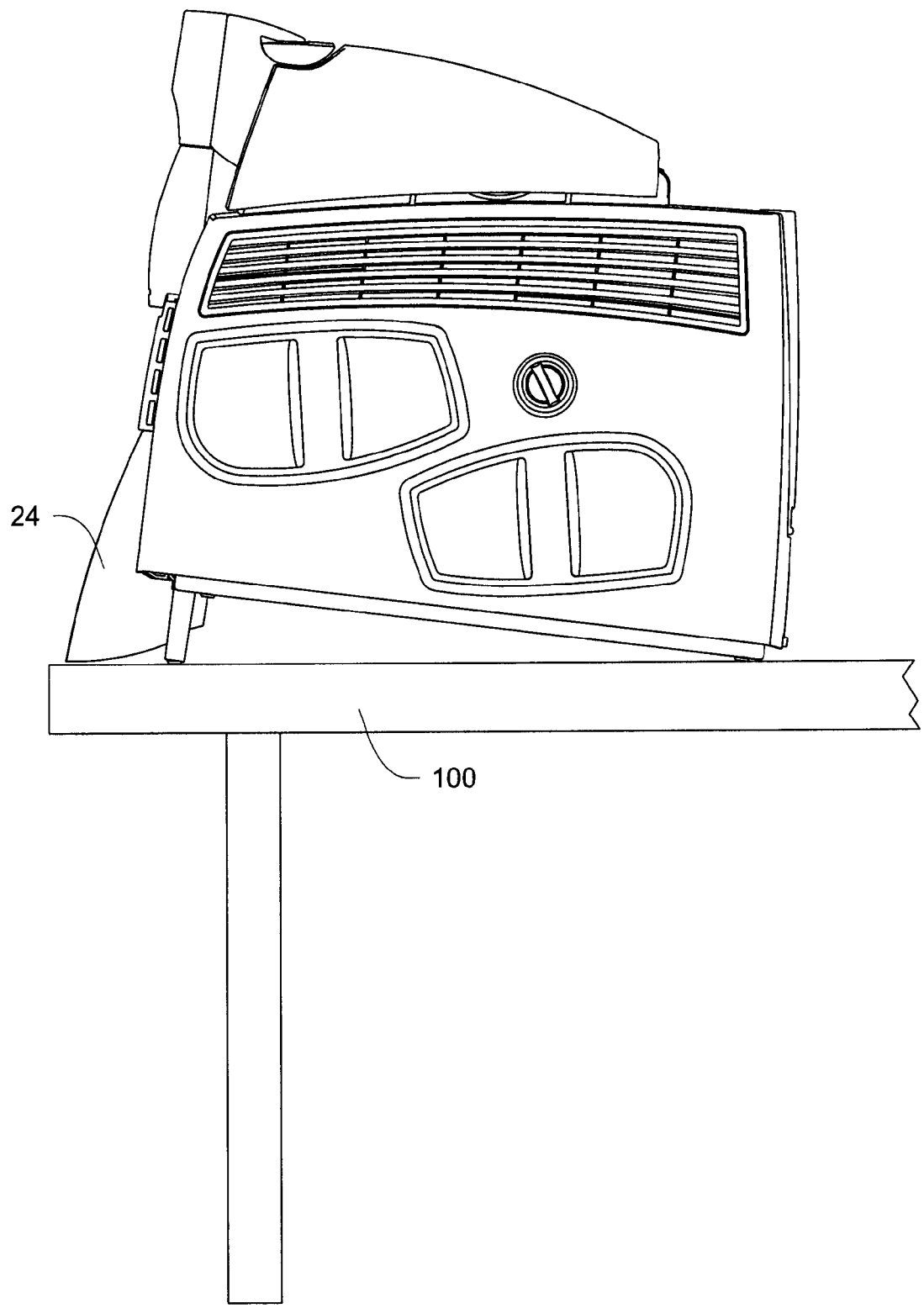
FIG. 5B is a side view of the card processor showing the output hopper acting as a support leg for the card processor.

Referring now to FIGS. 5A and 5B, the card output hopper 24 is configured to allow a large storage capacity without increasing the height of the processor. Cards are discharged from the card processor into the card output hopper 24 at the end of the lower card transport 44b nearest the front end of the processor. As can be seen in FIG. 5A, the card output hopper 24 extends below the lower end region 9 of the card processor. This allows the card processor operator to position the card output hopper 24 over the edge of a table or a desk 100, thereby causing the card processor to sit flush on the flat bottom surface of the processor. Alternatively, as shown in FIG. 5B, the card output hopper 24 can rest on the table or desk 100 and act as a support leg or a "kickstand" for the front end of the card processor, adding slightly to the height of the processor.

Figure 6A:
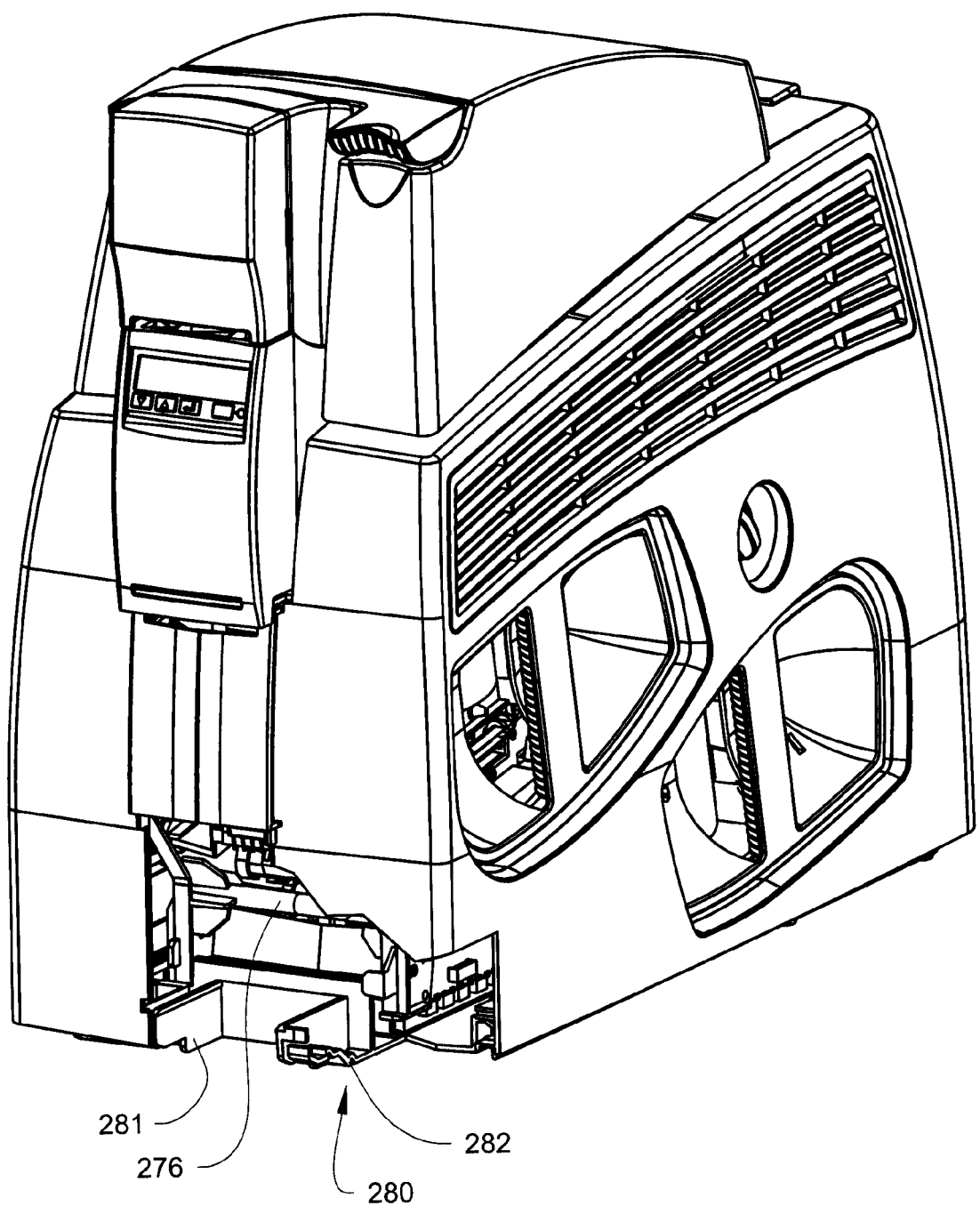
FIG. 6A is front perspective view of the card processor with the output hopper removed.
Figure 6B:
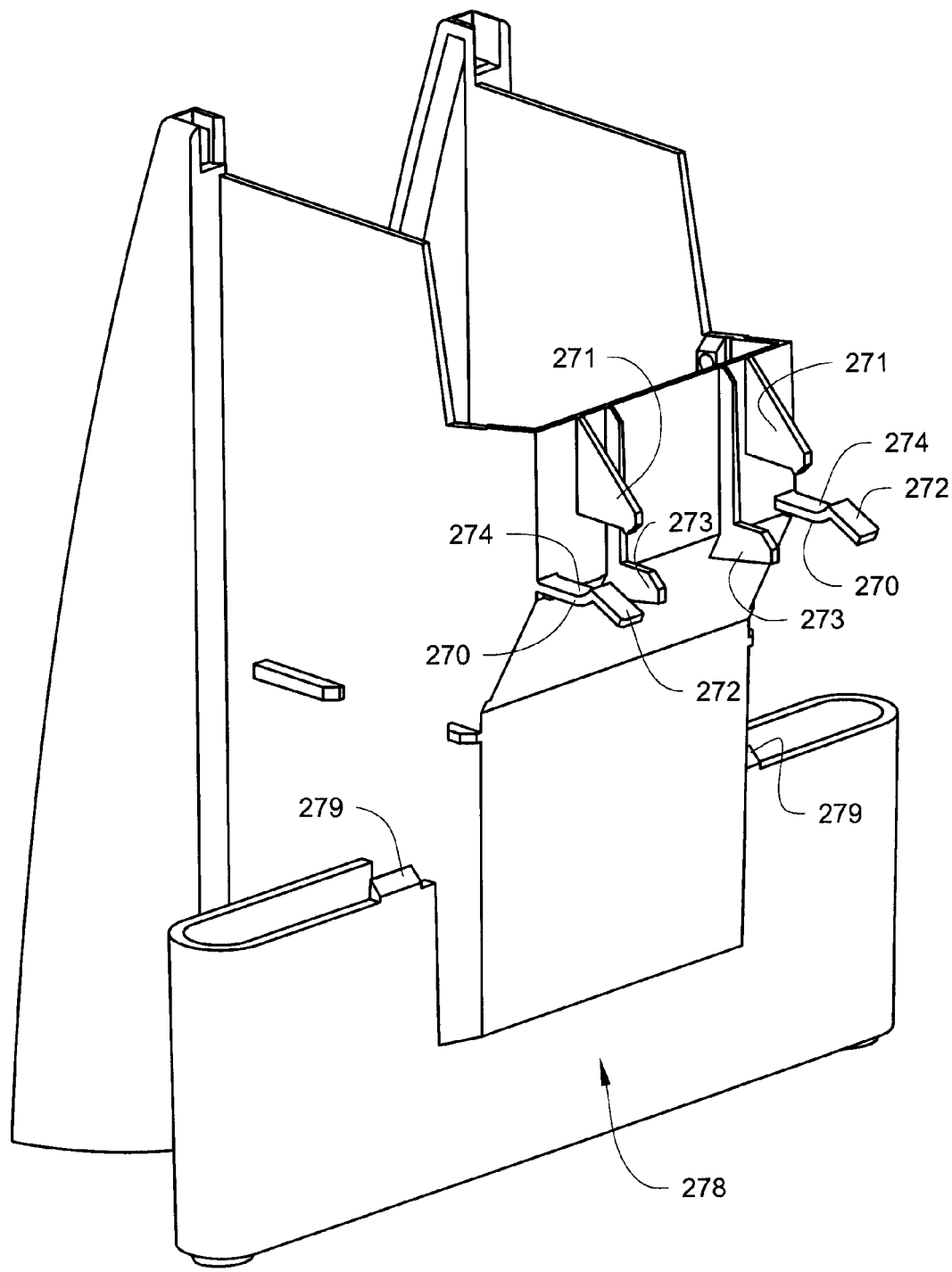
FIG. 6B is a rear perspective view of the output hopper.

FIGS. 6A and 6B illustrate how the output hopper 24 attaches to the card processor. The hopper 24 includes a pair of spaced resilient arms 270 that extend from the rear thereof, as shown in FIG. 6B. The arms 270 each include an angled ramp section 272 and a curved retention section 274. The arms 270 are designed to snap-fit connect with a shaft 276 (shown in FIG. 6A) adjacent the front end of the card processor 20, as shown in FIG. 5A. A pair of flanges 271 are associated with the arms 270 and are disposed above the shaft 276 when the hopper 24 is connected to the card processor as shown in FIG. 5A to prevent downward movement of the hopper 24. Similarly, a pair of flanges 273 are disposed underneath the shaft 276 to prevent upward movement of the hopper 24.

The output hopper 24 also includes a structure 278 that acts as the support leg in FIG. 5B. The structure 278 extends beyond the sides of the output hopper 24, and raised bosses 279 are defined at the top of the structure 278. With reference to FIG. 6A, a pair of resilient fingers 280 are defined adjacent the bottom of the card processor and project toward the front of the processor (only one finger 280 is visible in FIG. 6A; the second finger is hidden behind element 281). The fingers 280 include detents 282 defined on the bottom thereof that snap fit engage with the raised bosses 279 of the structure 278 as shown in FIG. 5A. This connection between the hopper 24 and card processor allows the hopper 24 to support the card processor when the hopper acts as the support leg in FIG. 5B.

In one embodiment, the upper card processing level 15 has a single card processing mechanism 42a in the form of a multi-color printer, while the lower card processing level 13 has two card processing mechanisms 42b each of which is a laminator. Preferably one laminating mechanism 42b is positioned above lower card transport 44b and the second laminating mechanism 42b is positioned below lower card transport 44b. This configuration facilitates one-pass lamination of the front and back of the card.

Figure 7:
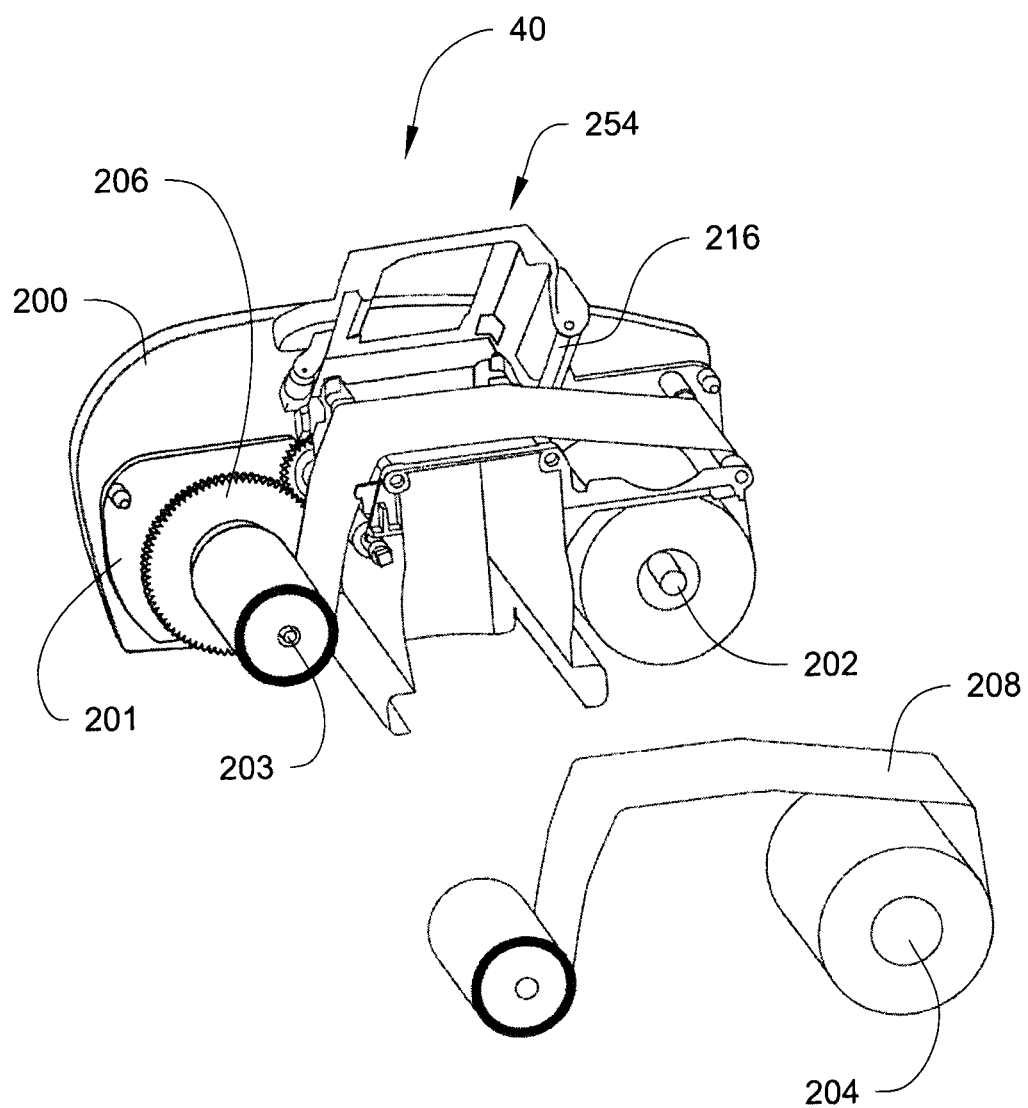
FIG. 7 is a perspective view of a lamination foil cartridge loaded with the foil and with the foil separate.

Referring to FIG. 7, the laminating mechanisms utilize lamination foil cartridges 40 that are inserted through the openings 32, 34 in the outside of the housing 26. The cartridges 40 are accessible to the operator without the operator being required to open a cover of the housing 26 or removing any portion of the housing 26. As a result, access to, and replacement of, the lamination foil on the cartridges 40 is made easier.

Figure 8:
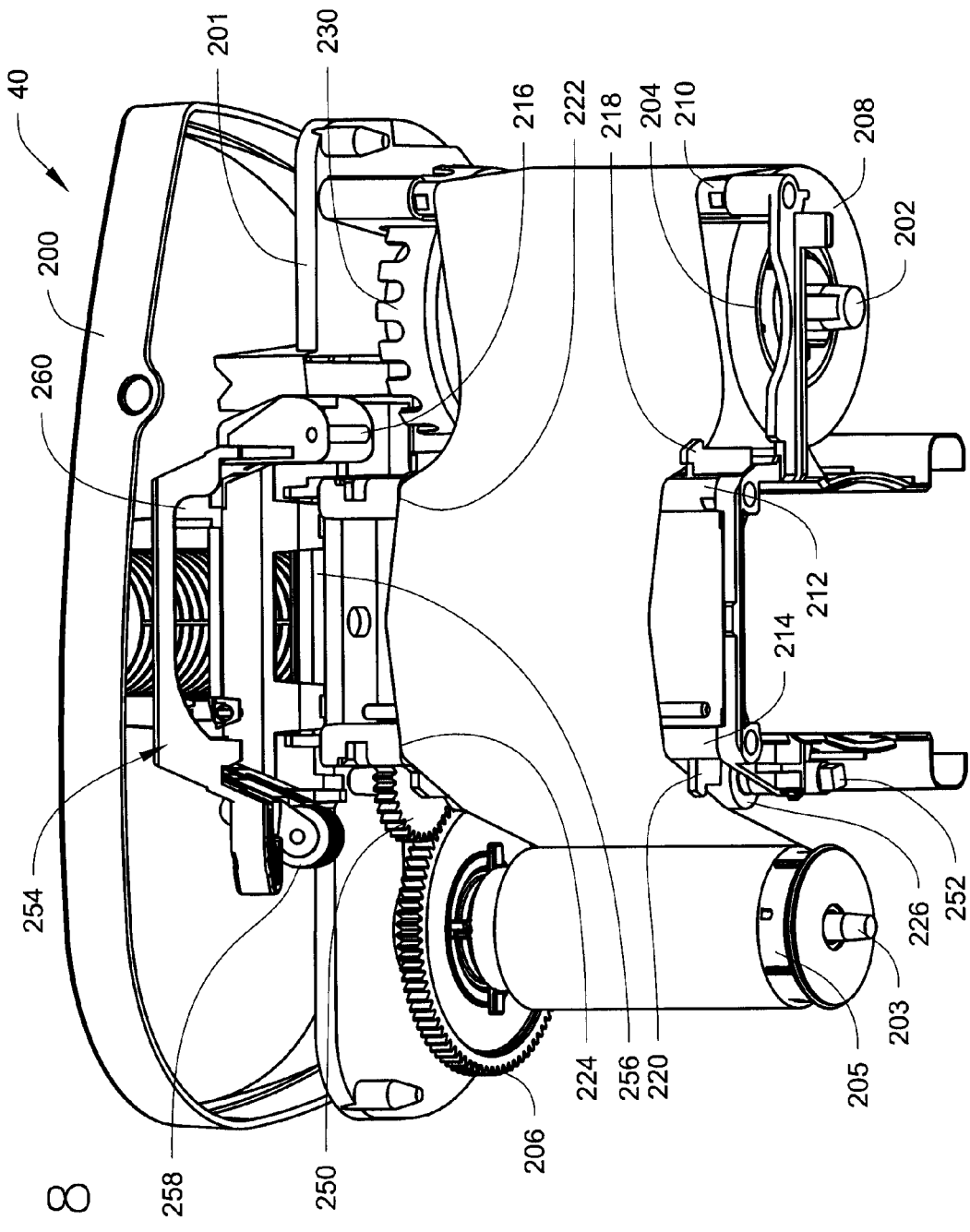
FIG. 8 is a perspective view of a lamination foil cartridge loaded with a roll of lamination boil.

As shown in FIGS. 7 and 8, each lamination foil cartridge 40 comprises an exterior housing 200 and a base plate 201 fixed to the housing 200. A supply spindle 202 and an uptake spindle 203 are rotatably affixed to the base plate 201. Affixed to uptake spindle 203 is a gear 206 that engages a drive gear 250. The drive gear 250 is connected to a nip roller 226 which has a boss 252 on the end thereof. The boss 252 engages with a drive mechanism (not shown) inside the card processor when the cartridge 40 is inserted into the processor.

A gate mechanism 254 is pivotally connected to a fixed shaft 256 on the base plate 201. The gate mechanism 254 is pivotable between a first, open position shown in FIGS. 7 and 8, and a second, closed position shown in FIG. 2 where the gate mechanism 254 is disposed over the lamination foil. The gate mechanism 254 includes an idler roller 258 rotatably mounted thereon that opposes the nip roller 226 when the gate mechanism 254 is at the second position. Further, the gate mechanism 254 includes a large rectangular opening 260 that permits access to the lamination foil when the gate mechanism is closed, as shown in FIG. 2.

A lamination foil 208 to be used is disposed on a supply roll 204 that is inserted onto the supply spindle 202 and the take-up end of the foil 208 is pre-attached to an uptake roll 205 that is disposed on the uptake spindle 203. When properly positioned and with the gate mechanism 254 closed, the lamination foil 208 runs over guide bar 210, under the guide bar 216 on the gate mechanism 254, over the top of guide bars 212 and 214, and between the nip formed by the nip roller 226 and roller 258. In addition, the lamination foil is guided along its edges by means of a channel formed between tabs 218, 220 affixed to guide bars 212, 214 and steps 222, 224 formed at the ends of the guide bars 212, 214. A suitable lamination foil for use in the card processor is disclosed in commonly owned, copending application Ser. No.11/051,125, titled SHEET MATERIAL WITH INDEX OPENINGS AND METHOD FOR MAKING AND USING A SHEET MATERIAL WITH INDEX OPENINGS, and filed on Feb. 4, 2005.

In operation, the lamination foil is advanced to expose a new section of lamination foil between guide bar 212 and guide bar 214 each time a card is to be laminated. Advancement of the lamination foil is achieved by driving the nip roller 226. The nip formed between the nip roller 226 and the idler roller 258 is sufficient to advance the foil in the direction of the arrow in FIG. 8 when the nip roller 226 is driven. When this occurs, the gear 250 drives the gear 206 which causes the take-up roll 205 to take-up slack foil.

The drive mechanism that drives the nip roller 226 preferably includes a clutch mechanism that prevents overdriving of the foil. The card to be laminated is driven at a slightly faster speed than the foil. Therefore, the movement of the card may cause the foil to advance at a faster rate than desired. The clutch mechanism prevents this and ensures that the foil is advanced at a constant rate.

When the foil is used up and the end of the foil is reached, the foil pulls away (i.e. detaches) from the supply roll 204. Referring to FIG. 8, a chopper wheel 230 is connected to and rotates with the supply spindle 202. The chopper wheel 230 includes a plurality of spaced teeth separated by gaps. A sensing mechanism (not shown) is positioned to sense rotation of the chopper wheel 230 by sensing the alternating teeth and gaps. When the chopper wheel 230 fails to rotate when rotation is expected, the card processor knows that the end of the foil has been reached and has pulled away from the supply roll 204.

Figure 9:
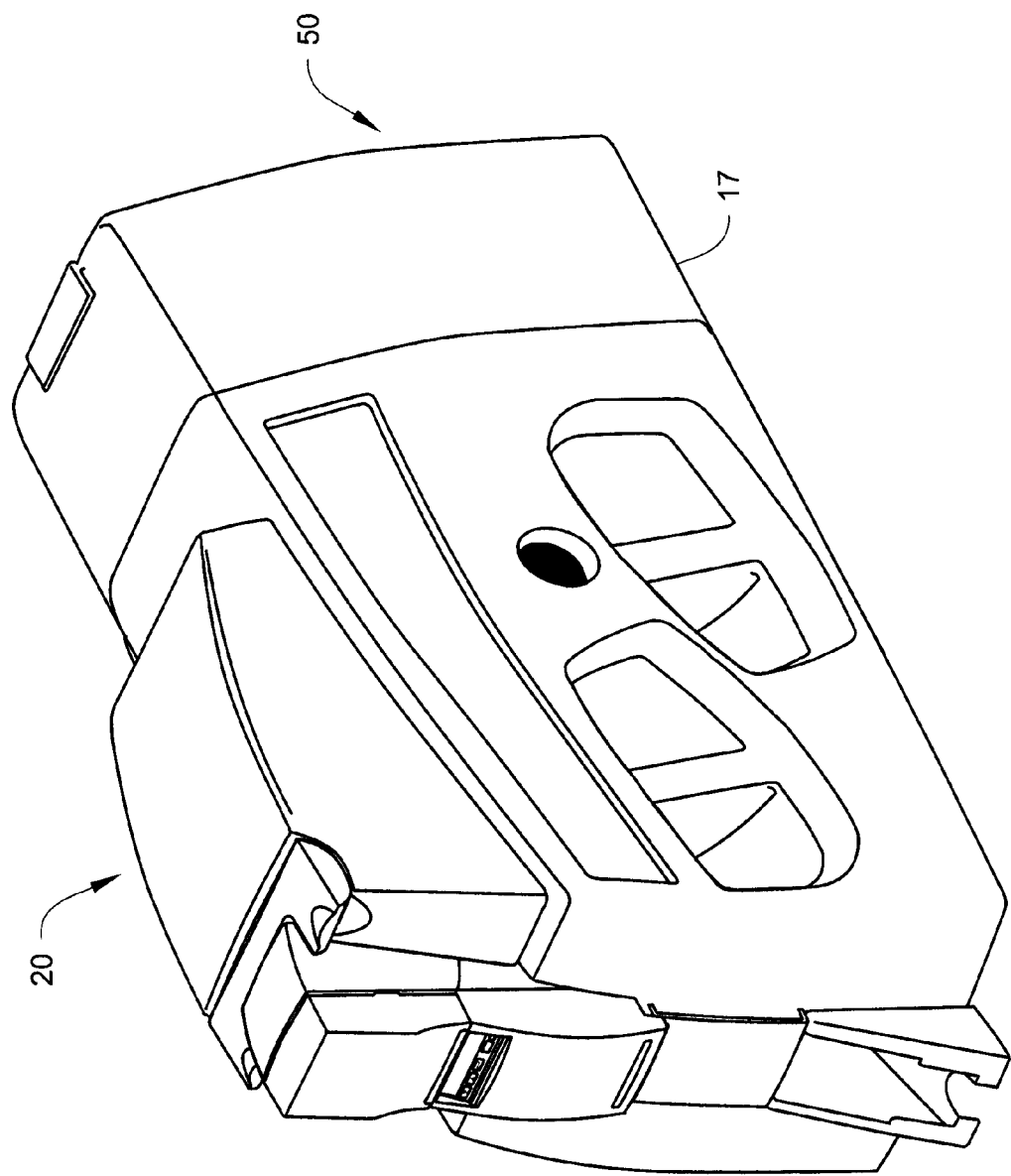
FIG. 9 is a perspective view of a card processor with a laser-engraving mechanism.
Figure 10:
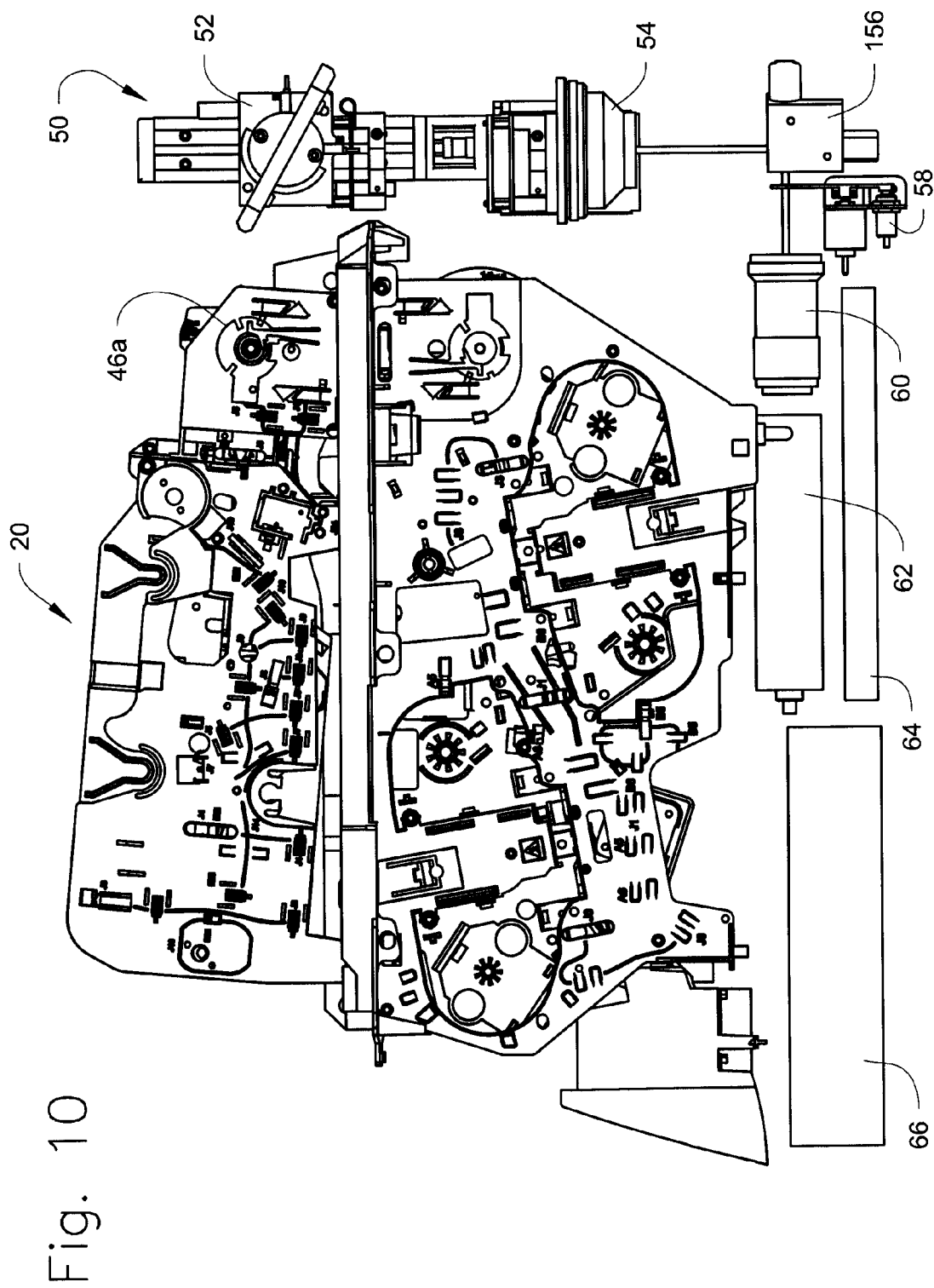
FIG. 10 is a cross-sectional view of a card processor with a laser-engraving mechanism.

Referring now to FIGS. 9 and 10, the card processor 20 may include a laser engraving mechanism 50 for performing laser personalization on the card. The laser engraving mechanism 50 may be located as an add-on mechanism toward the rear 17 of the card processor 20, with portions of the mechanism 50 extending under the card processor as shown in FIG. 10.

With reference to FIG. 9, the laser engraving mechanism 50 comprises a power supply 66 for powering the laser and a printed circuit assembly (PCA) board 64 for controlling the laser and/or portions or all of the processor 20. A laser head 62 generates a laser beam, which is expanded by beam expander 60. The transmission of the laser beam is regulated by a beam shutter and solenoid 58, which is controlled by the PCA board 64. Proximate the beam shutter and solenoid 58 is a beam deflector 56 for deflecting the beam to create a useful pattern on the card. The beam is then transmitted to a F-Theta lens 54 which focuses the beam to a focal point.

To engrave a card, the card is transferred from the upper card reorienting mechanism 46a into a card stage 52. The card stage 52 is configured to orient the card at various angles with respect to the direction of the laser beam and configured to translate the card up and down as shown by the arrows in FIG. 10 to keep the card surface being engraved at the focal point. A suitable card stage 52 is used in the DCL30 Desktop Card Laser Personalization System available from DataCard Corporation of Minnetonka, Minn.

Further, as indicated in FIGS. 1B and 1C, the card processor may also include an optical laser that is capable of writing and reading data to and from a surface of an optical memory card. Optical laser structure for writing and reading data on optical data cards is known in the art, including the Laser-Card® 600-Q optical card read/write drive available from LaserCard Corporation of Mountain View, Calif.

The above specification and examples provide a complete description of the invention. Many embodiments of the invention, not explicitly described herein, can be made without departing from the spirit and scope of the invention.

The invention claimed is:

1. A desktop card printer for personalizing cards, comprising:
   an input for inputting a card into the card printer;
   an output for outputting a card from the card printer;
   the input and the output are generally vertically separated one above the other;
   a card transport for transporting a card within the card printer;
   a laser engraving mechanism for laser engraving a card; and
   at least one of a printing mechanism for performing printing operations on a card or a laminator for laminating a card;
   wherein the desktop card printer includes a plurality of card processing levels that are generally vertically separated one above the other;
   wherein the desktop card printer has a front end region and a back end region and the back end region is located at the opposite end of the desktop card printer from the front end region; and
   wherein the input and output are located at the front end region.

2. The desktop card printer of claim 1, wherein the input comprises an input hopper and the output comprises an output hopper.

3. The desktop card printer of claim 1, wherein the card printer comprises a printing mechanism and a laminator.

4. The desktop card printer of claim 1, further comprising a plurality of card transports for transporting a card within the card printer.

5. The desktop card printer of claim 4, wherein the plurality of card transports have reversible drive mechanisms.

6. The desktop card printer of claim 1, further comprising a first card reorienting mechanism.

7. The desktop card printer of claim 1, wherein the card transport has a reversible drive mechanism.

8. The desktop card printer of claim 1, wherein the first card transport is located between the front end region and the back end region, and the laser engraving mechanism is located adjacent the end of the first card transport at the back end region.

9. A desktop card printer for personalizing cards, comprising:
   an input for inputting a card into the card printer;
   an output for outputting a card from the card printer;
   a card transport for transporting a card within the card printer;
   a laser engraving mechanism for laser engraving a card; and
   at least one of a printing mechanism for performing printing operations on a card or a laminator for laminating a card;
   wherein the desktop card printer includes a plurality of card processing levels that are generally vertically separated one above the other;
   wherein the desktop card printer has a front end region and a back end region and the back end region is located at the opposite end of the desktop card printer from the front end region;
   wherein the input and output are located at the front end region; and
   a plurality of card reorienting mechanisms.

10. A desktop card printer for personalizing cards, comprising:
   an input for inputting a card into the card printer;
   an output for outputting a card from the card printer;
   a card transport for transporting a card within the card printer;
   a laser engraving mechanism for laser engraving a card; and
   at least one of a printing mechanism for performing printing operations on a card or a laminator for laminating a card;
   the input and output are located at a front end region of the desktop card printer, and the input and output are vertically separated one above the other; and
   the laser engraving mechanism is located at a back end region of the desktop card printer, and the printing mechanism or the laminator are located in the desktop card printer between the front end region and the laser engraving mechanism.

11. The desktop card printer of claim 10, wherein the input comprises an input hopper and the output comprises an output hopper.

12. The desktop card printer of claim 11, wherein the card printer comprises a printing mechanism and a laminator, and the printing mechanism and the laminator are located in the desktop card printer between the front end region and the laser engraving mechanism.

13. The desktop card printer of claim 11, wherein the card transport has a reversible drive mechanism.

* * * * *